June 21, 1932. J. E. SCHMIDT 1,863,913
INTERCHANGEABLE STRUCTURE
Filed Aug. 6, 1930
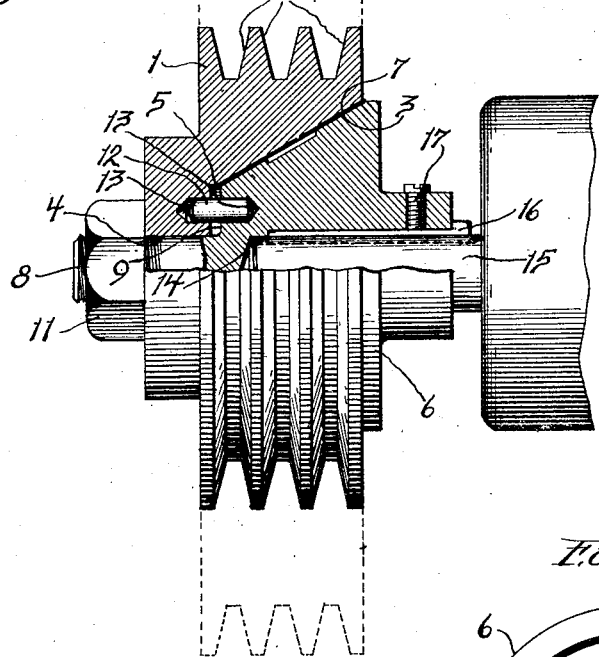
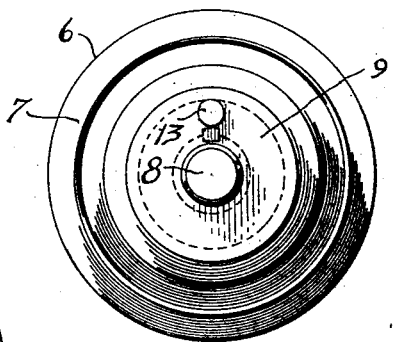
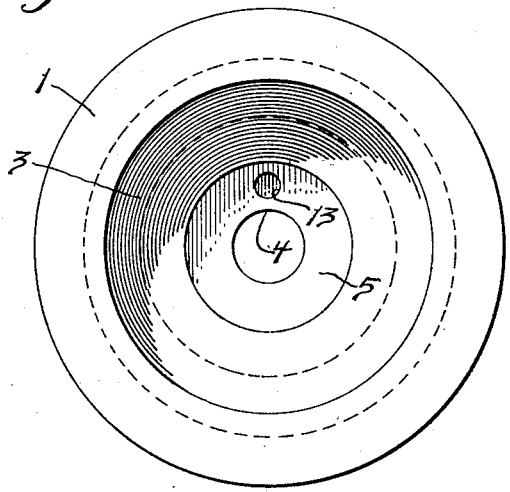
Inventor,
John E. Schmidt Patented June 21, 1932

1,863,913

UNITED STATES PATENT OFFICE

JOHN E. SCHMIDT, OF CHICAGO, ILLINOIS, ASSIGNOR TO KLING BROS. ENGINEERING WORKS, OF CHICAGO, ILLINOIS, A CORPORATION OF ILLINOIS

INTERCHANGEABLE STRUCTURE

Application filed August 6, 1930. Serial No. 473,478.

My invention relates particularly to an interchangeable pulley structure for change speed drives involving the interchange of pulleys for effecting different speeds, although not limited to this use alone.

The general object of the invention resides in the provision of such a novel, effective and rugged structure wherein the pulley or like element is quickly mounted on or removed from a spindle element, wherein the pulley or like element is securely mounted in centered relation on the spindle element, and wherein the pulley or like element is not liable to stick or freeze on the spindle element with consequent trouble in removing it from the spindle element.

With this object in view my invention consists in certain features of novelty in the construction, combination and arrangement of parts by which the said object and certain other objects, hereinafter appearing, are effected, all as fully described with reference to the accompanying drawing and more particularly pointed out in the appended claims.

In the said drawing—

Figure 1 is a side elevation of a pulley structure embodying my invention with a portion broken away and shown in axial section;

Figure 2 is an inner end elevation of the pulley element of the structure; and,

Figure 3 is an outer end elevation of the spindle element of the structure.

Like characters of reference indicate like parts in the several views.

Referring to the drawing, 1 designates a bored pulley element provided with a plurality of peripheral V grooves 2 for the accommodation of a plural V belt drive. See Figures 1 and 2.

The pulley element 1 is provided in its bore with a relatively steep axial taper 3, a reduced cylindrical portion 4 at the small end of said taper, and a radial shoulder 5 therebetween.

A spindle element is designated at 6 and is provided with a corresponding relatively steep axial taper 7 engageable with the taper 3 of the pulley element, a reduced cylindrical axial end portion 8 adjoining the small end of the taper 7, and a radial shoulder 9 between the taper 7, and the end portion 8. See Figures 1 and 3.

The taper 3 of the pulley element is engageable with the taper 7 of the spindle element and the reduced cylindrical portion 4 of the bore of the pulley element is engageable on the reduced end portion 8 of the spindle element in the mounting of the pulley element upon the spindle element, and a nut 11 is screwthreaded upon the end portion 8 of the spindle element for clamping the pulley and spindle elements axially to engage the tapers 3 and 7.

As so mounted on the spindle element 6, the pulley element 1 is adequately supported on the spindle element and is centered thereon by the engagement of the tapers 3 and 7, the relative steepness of the tapers obviating freezing or sticking of the pulley element on the spindle element with consequent difficulty in removing the pulley element from the spindle element.

An axially extending stud 12, is engaged in bores 13 in the pulley and spindle elements at the shoulders 5 and 9 to positively secure the pulley and spindle elements angularly, this structure being also adapted for the convenient removal of the pulley element from the spindle element.

The spindle element 6 is provided with an axial bore 14, in the end thereof opposite that at which the reduced end portion 8 is disposed for engagement with the projecting end of a shaft 15 for the mounting of the spindle element thereon, see Figure 1, the spindle element and the shaft being angularly fixed with the shaft by a key 16 engaged in keyways in the bore 14 and on the shaft 15 and clamped by a set screw 17 screwthreaded radially in the spindle element and engaging said key, thus adapting the spindle element for mounting the same on a shaft.

While I have described and shown the preferred embodiment of my invention I do not wish to be limited to the precise details of construction as changes may readily be made without departing from the spirit of my invention, but having thus described my invention, I claim as new and desire to secure by Letters Patent the following:

1. In an interchangeable structure the combination with a bored element and a spindle element adapted to be engaged by the bore of said bored element, said bored element being provided in its bore with a relatively steep axial taper and a reduced cylindrical axial portion at the small end of said taper and a radial shoulder therebetween, said spindle element being provided with a corresponding relatively steep axial taper engageable with said taper of the bored element and provided with a reduced cylindrical axial end portion adjoining the small end of said taper thereof and engageable with said cylindrical portion of the bore of said bored element and provided with a radial shoulder between said end portion and said taper thereof and provided further with an axial bore in its other end for the mounting thereof on the end of a shaft, a nut screwthreaded upon the said end portion of the spindle element for clamping said elements axially to engage said tapers, and an axially extending stud engaged in bores in said elements at said shoulders thereof for angularly fixing said elements and adapted to permit axial engagement and disengagement of said elements.

2. In an interchangeable structure the combination with a bored element and a spindle element adapted to be engaged by the bore of said bored element, said bored element being provided in its bore with a relatively steep axial taper and a reduced cylindrical axial portion at the small end of said taper and a radial shoulder therebetween, said spindle element being provided with a corresponding relatively steep axial taper engageable with said taper of the bored element and provided with a reduced cylindrical axial end portion adjoining the small end of said taper thereof and engageable with said cylindrical portion of the bore of said bored element and provided with a radial shoulder between said end portion and said taper thereof, a nut screwthreaded upon said end portion of the spindle element for clamping said elements axially to engage said tapers, and an axially extending stud engaged in bores in said elements at said shoulders thereof for angularly fixing said elements and adapted to permit axial engagement and disengagement of said elements.

In witness whereof I hereunto affix my signature this 16th day of July, 1930.

JOHN E. SCHMIDT.